(12) United States Patent
Shaw

(10) Patent No.: US 10,198,148 B2
(45) Date of Patent: Feb. 5, 2019

(54) RADIAL MENU USER INTERFACE WITH ENTRY POINT MAINTENANCE

(71) Applicant: MICROSOFT TECHNOLOGY LICENSING, LLC, Redmond, WA (US)

(72) Inventor: Han-Yi Shaw, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 630 days.

(21) Appl. No.: 14/158,489

(22) Filed: Jan. 17, 2014

(65) Prior Publication Data

US 2015/0205455 A1    Jul. 23, 2015

(51) Int. Cl.
*G06F 3/0482* (2013.01)
*G06F 3/0484* (2013.01)
*G06F 3/0488* (2013.01)

(52) U.S. Cl.
CPC .......... *G06F 3/0482* (2013.01); *G06F 3/0488* (2013.01); *G06F 3/04842* (2013.01)

(58) Field of Classification Search
CPC ... G06F 3/00; G06F 3/01; G06F 3/041; G06F 3/048; G06F 3/0481; G06F 3/0482; G06F 3/04842; G06F 3/0484; G06F 3/0488; G06T 13/00; G06T 13/40; G06T 13/80

See application file for complete search history.

(56) References Cited

U.S. PATENT DOCUMENTS

| 6,448,987 | B1 | 9/2002 | Easty et al. |
| 6,549,219 | B2 | 4/2003 | Selker |
| 7,418,670 | B2 * | 8/2008 | Goldsmith ............ G06F 3/0482 715/810 |
| 7,509,348 | B2 * | 3/2009 | Burtner ................. G06F 3/0482 |

(Continued)

FOREIGN PATENT DOCUMENTS

EP    1521168 A2    4/2005

OTHER PUBLICATIONS

Hachman, Mark, "Are Radial Menus The Future of Office?", Published on: Oct. 29, 2012, Available at: http://readwrite.com/2012/10/29/are-radial-men us-the-future-of-office.

(Continued)

*Primary Examiner* — Xiomara L Bautista
(74) *Attorney, Agent, or Firm* — Merchant & Gould P.C.

(57) ABSTRACT

Embodiments provide circular or radial menu features that may be used in conjunction with various application and devices/systems. A device of an embodiment includes a radial menu interface configured to display primary menu items in response to a first user interaction and display secondary menu items in response to actuation of an associated primary menu item, wherein the display of secondary menu items includes a simultaneous display of a selected primary menu item. A method of an embodiment operates in part by displaying a plurality of first level menu items in response to a first user interaction and displaying a plurality of second level menu items in response to actuation of a displayed first level menu item, wherein the display of the plurality of second level menu items includes animating the display of the plurality of second level menu items with respect to the displayed first level menu item.

20 Claims, 14 Drawing Sheets

(56) References Cited

U.S. PATENT DOCUMENTS

| | | | |
|---|---|---|---|
| 7,669,146 B2* | 2/2010 | Lauff | G06F 3/0482 715/810 |
| 7,788,599 B2* | 8/2010 | Michaud | G06F 3/0482 715/810 |
| 8,185,844 B2* | 5/2012 | Tsai | G06F 3/0482 715/810 |
| 8,245,156 B2 | 8/2012 | Mouilleseaux et al. | |
| 8,375,329 B2* | 2/2013 | Drayton | G06F 3/0482 715/767 |
| 9,104,275 B2* | 8/2015 | Kim | G06F 3/041 |
| 9,448,692 B1* | 9/2016 | Mierau | G06F 3/04817 |
| 2004/0128275 A1* | 7/2004 | Moehrle | G06F 17/30126 |
| 2006/0095865 A1* | 5/2006 | Rostom | G06F 3/0482 715/810 |
| 2007/0094597 A1* | 4/2007 | Rostom | G06F 3/0482 715/700 |
| 2007/0136286 A1* | 6/2007 | Webster | G06F 17/30064 |
| 2007/0236475 A1* | 10/2007 | Wherry | G06F 3/0485 345/173 |
| 2007/0271528 A1* | 11/2007 | Park | G06F 3/0482 715/810 |
| 2008/0059913 A1 | 3/2008 | Burtner et al. | |
| 2008/0215240 A1* | 9/2008 | Howard | G06F 3/0488 701/469 |
| 2009/0019397 A1* | 1/2009 | Buffet | G06F 3/0482 715/837 |
| 2009/0079731 A1* | 3/2009 | Fitzmaurice | G06F 3/04815 345/419 |
| 2009/0172598 A1* | 7/2009 | Yamanaka | G06F 3/0482 715/841 |
| 2009/0289907 A1* | 11/2009 | Ruscher | G06F 3/0482 345/173 |
| 2009/0327955 A1 | 12/2009 | Mouilleseaux et al. | |
| 2010/0100849 A1* | 4/2010 | Fram | G06F 3/0236 715/835 |
| 2010/0180233 A1* | 7/2010 | Kruzeniski | G06F 3/0482 715/834 |
| 2010/0248787 A1* | 9/2010 | Smuga | G06F 3/0482 455/566 |
| 2010/0281374 A1* | 11/2010 | Schulz | G06F 3/0482 715/723 |
| 2010/0287468 A1* | 11/2010 | Reifman | G06F 3/04886 715/702 |
| 2011/0047014 A1* | 2/2011 | De Angelo | G06F 3/0482 705/14.4 |
| 2011/0066980 A1 | 3/2011 | Chmielewski et al. | |
| 2011/0066981 A1 | 3/2011 | Chmielewski et al. | |
| 2012/0173982 A1* | 7/2012 | Herz | G06F 3/0482 715/719 |
| 2012/0297342 A1* | 11/2012 | Jang | G06F 3/04817 715/823 |
| 2013/0019182 A1 | 1/2013 | Gil et al. | |
| 2013/0019206 A1 | 1/2013 | Kotler et al. | |
| 2013/0104079 A1 | 4/2013 | Yasui et al. | |
| 2015/0058887 A1* | 2/2015 | Maier | H04N 5/4403 725/38 |
| 2015/0106708 A1* | 4/2015 | Monte | G06F 3/0482 715/704 |
| 2016/0026345 A1* | 1/2016 | Yao | G06F 3/0488 715/815 |
| 2016/0306508 A1* | 10/2016 | Voisin | G06F 3/0482 |

OTHER PUBLICATIONS

Samp, et al., "Supporting menu design with radial layouts", In Proceedings of the International Conference Advanced Visual Interfaces, May 25, 2010, 8 pages.

Samp, et al., "Modeling Hierarchical Menu Selections: Effects of Additive Factors", In Digital Enterprise Research Institute Technical Report, Jan. 2010, 25 pages.

"WinForms Radial Menu", Published on: Apr. 25, 2012, Available at: http://www.devexpress.com/Products/NET/Controls/WinForms/Bars/radial_menu.xml.

Chrisjf", The Hybrid Radial Context Menu for Firefox", Published on: Nov. 1, 2008, Available at: http://chrisjf.blogspot.in/2008/11/hybrid-radial-context-menu-for-firefox.html.

Samp, et al., "Visual Search in Radial Menus", In Proceedings of the 13th IFIP TC 13 International Conference on Human-Computer Interaction, Volume Part IV, Sep. 5, 2011, 8 pages.

Written Opinion of the International Preliminary Examining Authority dated Nov. 12, 2015 in Application PCT/US2015/010940, 11 pgs.

"International Search Report and Written Opinion Issued for PCT Patent Application No. PCT/US2015/010940", dated Apr. 23, 2015, 17 Pages.

"International Preliminary Report on Patentability Issued in PCT Application No. PCT/US2015/010940" dated Apr. 21, 2016, 13 Pages.

* cited by examiner

| | A | B | C | D | E | F | G | H | I |
|---|---|---|---|---|---|---|---|---|---|
| 1 | COLLEGE NAME | STATE | CITY | SLEEP | GPA | | | | |
| 2 | PRINCETON UNIVERSITY | NJ | PRINCETON | 7.386 | 3.781 | | | | |
| 3 | HARVARD UNIVERSITY | MA | CAMBRIDGE | 7.134 | 3.782 | | | | |
| 4 | YALE UNIVERSITY | CT | NEW HAVEN | 7.415 | 3.746 | | | | |
| 5 | COLUMBIA UNIVERSITY | NY | NEW YORK | 7.047 | 3.771 | | | | |
| 6 | STANFORD UNIVERSITY | CA | STANFORD | 7.26 | 3.727 | | | | |
| 7 | UNIV. OF PENNSYLVANIA | PA | PHILADELPHI | 7.004 | 3.664 | | | | |
| 8 | CALIFORNIA INSTITUTE OF TECHN... | CA | PASADENA | 7.07 | 3.687 | | | | |
| 9 | MASSACHUSETTS INSTITUTE OF... | MA | CAMBRIDGE | 7.033 | 3.687 | | | | |
| 10 | DARTMOUTH COLLEGE | NH | HANOVER | 7.135 | 3.665 | | | | |
| 11 | DUKE UNIVERSITY | NC | DURHAM | 6.950 | 3.638 | | | | |
| 12 | UNIVERSITY OF CHICAGO | IL | CHICAGO | 7.21 | 3.639 | | | | |
| 13 | NORTHWESTERN UNIVERSITY | IL | EVANSTON | 7.254 | 3.665 | | | | |
| 14 | JOHNS HOPKINS UNIVERSITY | MD | BALTIMORE | 6.99 | 3.686 | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |

*FIGURE 3A*

| | A | B | C | D | E | F | G | H | I |
|---|---|---|---|---|---|---|---|---|---|
| 1 | COLLEGE NAME | STATE | CITY | SLEEP | GPA | | | | |
| 2 | PRINCETON UNIVERSITY | NJ | PRINCETON | 7.386 | 3.781 | | | | |
| 3 | HARVARD UNIVERSITY | MA | CAMBRIDGE | 7.134 | 3.782 | | | | |
| 4 | YALE UNIVERSITY | CT | NEW HAVEN | 7.415 | 3.746 | | | | |
| 5 | COLUMBIA UNIVERSITY | NY | NEW YORK | 7.047 | 3.771 | | | | |
| 6 | STANFORD UNIVERSITY | CA | STANFORD | 7.26 | 3.727 | | | | |
| 7 | UNIV. OF PENNSYLVANIA | PA | PHILADELPHI | 7.004 | 3.664 | | | | |
| 8 | CALIFORNIA INSTITUTE OF TECHN... | CA | PASADENA | 7.07 | 3.687 | | | | |
| 9 | MASSACHUSETTS INSTITUTE OF... | MA | CAMBRIDGE | 7.033 | 3.687 | | | | |
| 10 | DARTMOUTH COLLEGE | NH | HANOVER | 7.135 | 3.665 | | | | |
| 11 | DUKE UNIVERSITY | NC | DURHAM | 6.956 | 3.638 | | | | |
| 12 | UNIVERSITY OF CHICAGO | IL | CHICAGO | 7.21 | 3.639 | | | | |
| 13 | NORTHWESTERN UNIVERSITY | IL | EVANSTON | 7.254 | 3.665 | | | | |
| 14 | JOHNS HOPKINS UNIVERSITY | MD | BALTIMORE | 6.99 | 3.686 | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |

*FIGURE 3B*

|  | A | B | C | D | E | F | G | H | I |
|---|---|---|---|---|---|---|---|---|---|
| 1 | COLLEGE NAME | STATE | CITY | SLEEP | GPA | | | | |
| 2 | PRINCETON UNIVERSITY | NJ | PRINCETON | 7.386 | 3.781 | | | | |
| 3 | HARVARD UNIVERSITY | MA | CAMBRIDGE | 7.134 | 3.782 | | | | |
| 4 | YALE UNIVERSITY | CT | NEW HAVEN | 7.415 | 3.746 | | | | |
| 5 | COLUMBIA UNIVERSITY | NY | NEW YORK | 7.047 | 3.771 | | | | |
| 6 | STANFORD UNIVERSITY | CA | STANFORD | 7.26 | 3.727 | | | | |
| 7 | UNIV. OF PENNSYLVANIA | PA | PHILADELPHI | 7.004 | 3.664 | | | | |
| 8 | CALIFORNIA INSTITUTE OF TECHN... | CA | PASADENA | 7.07 | 3.687 | | | | |
| 9 | MASSACHUSETTS INSTITUTE OF... | MA | CAMBRIDGE | 7.033 | 3.687 | | | | |
| 10 | DARTMOUTH COLLEGE | NH | HANOVER | 7.135 | 3.665 | | | | |
| 11 | DUKE UNIVERSITY | NC | DURHAM | 6.956 | 3.638 | | | | |
| 12 | UNIVERSITY OF CHICAGO | IL | CHICAGO | 7.21 | 3.639 | | | | |
| 13 | NORTHWESTERN UNIVERSITY | IL | EVANSTON | 7.254 | 3.6 | | | | |
| 14 | JOHNS HOPKINS UNIVERSITY | MD | BALTIMORE | 6.99 | 3. | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |

*FIGURE 3C*

| | A | B | C | D | E | F | G | H | I |
|---|---|---|---|---|---|---|---|---|---|
| 1 | COLLEGE NAME | STATE | CITY | SLEEP | GPA | | | | |
| 2 | PRINCETON UNIVERSITY | NJ | PRINCETON | 7.386 | 3.781 | | | | |
| 3 | HARVARD UNIVERSITY | MA | CAMBRIDGE | 7.134 | 3.782 | | | | |
| 4 | YALE UNIVERSITY | CT | NEW HAVEN | 7.415 | 3.746 | | | | |
| 5 | COLUMBIA UNIVERSITY | NY | NEW YORK | 7.047 | 3.771 | | | | |
| 6 | STANFORD UNIVERSITY | CA | STANFORD | 7.26 | 3.727 | | | | |
| 7 | UNIV. OF PENNSYLVANIA | PA | PHILADELPHI | 7.004 | 3.664 | | | | |
| 8 | CALIFORNIA INSTITUTE OF TECHN... | CA | PASADENA | 7.07 | 3.687 | | | | |
| 9 | MASSACHUSETTS INSTITUTE OF ... | MA | CAMBRIDGE | 7.033 | 3.687 | | | | |
| 10 | DARTMOUTH COLLEGE | NH | HANOVER | 7.135 | 3.665 | | | | |
| 11 | DUKE UNIVERSITY | NC | DURHAM | 6.956 | 3.638 | | | | |
| 12 | UNIVERSITY OF CHICAGO | IL | CHICAGO | 7.21 | 3.63 | | | | |
| 13 | NORTHWESTERN UNIVERSITY | IL | EVANSTON | 7.254 | 3. | | | | |
| 14 | JOHNS HOPKINS UNIVERSITY | MD | BALTIMORE | 6.99 | 3.638 | | | | |
| 15 | | | | | | | | | |
| 16 | | | | | | | | | |
| 17 | | | | | | | | | |
| 18 | | | | | | | | | |
| 19 | | | | | | | | | |
| 20 | | | | | | | | | |

*FIGURE 3D*

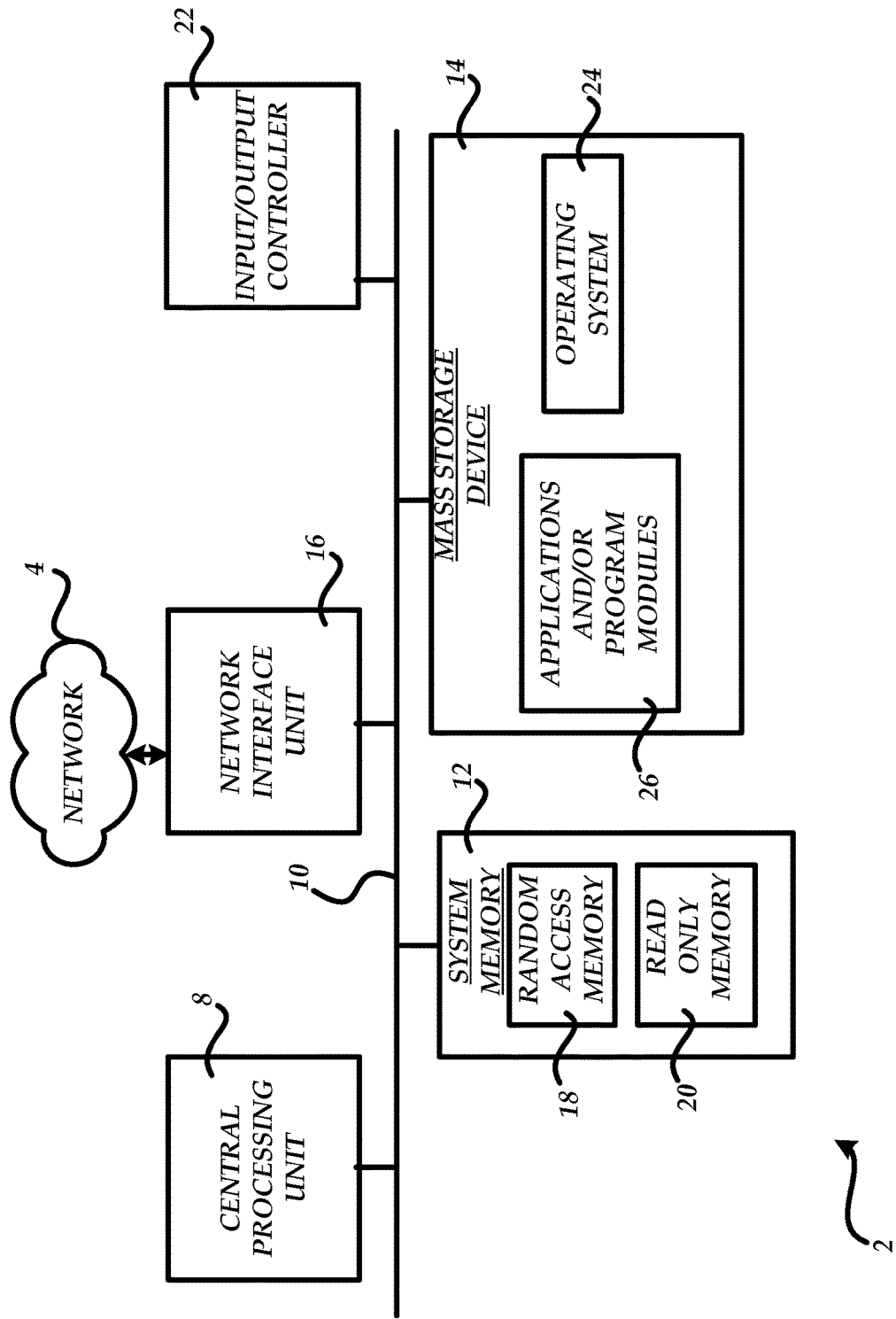

RADIAL MENU USER INTERFACE WITH ENTRY POINT MAINTENANCE

BACKGROUND

Radial menu user interfaces (UIs) (also referred to as circular or pie menu UIs) generally include a circular layout design in contrast to the more conventional linear menu UI paradigm. The layout and use differences of linear menu UIs and radial menu UIs are significant and both paradigms have advantages, disadvantages, and user appeal. Radial menus offer a distinct and wholly different visual and use experience as compared to linear menus. Linear menu UIs are typically located away from a user's current focus and are not always relevant contextually. However, acceptance of radial menu UIs continues to lag behind the more traditional linear menu paradigm.

Some radial menu UIs can be excessively cluttered, disorienting, and/or provide sub-optimal use experiences. For example, due in part to the more limited available display area for menu controls within a circular area, developers may attempt to put too many controls or options in each pie or wedge slice, resulting in smaller click targets which can lead to increased input errors and mistakes. Radial menu parameters such as item density, item spacing, item shapes, etc. have a direct influence on the usability and acceptance of a radial menu UI.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide circular or radial menu features, but are not so limited. A device of an embodiment includes a radial menu user interface (UI) configured to display primary menu items in response to a first user interaction and display secondary menu items in response to actuation of an associated primary menu item, wherein the display of secondary menu items includes a simultaneous display of a selected primary menu item. A method of an embodiment operates in part by displaying a plurality of first level menu items in response to a first user interaction and displaying a plurality of second level menu items in response to actuation of a displayed first level menu item, wherein the display of the plurality of second level menu items includes animating the display of the plurality of second level menu items with respect to the displayed first level menu item. Other embodiments are included.

These and other features and advantages will be apparent from a reading of the following detailed description and a review of the associated drawings. It is to be understood that both the foregoing general description and the following detailed description are explanatory only and are not restrictive of the invention as claimed.

BRIEF DESCRIPTION OF THE DRAWINGS

FIGS. 3A-3H depict an exemplary handheld computing device configured with radial menu features.

FIG. 4 is a block diagram illustrating an exemplary computing environment for implementation of various embodiments.

DETAILED DESCRIPTION

Figure 1:
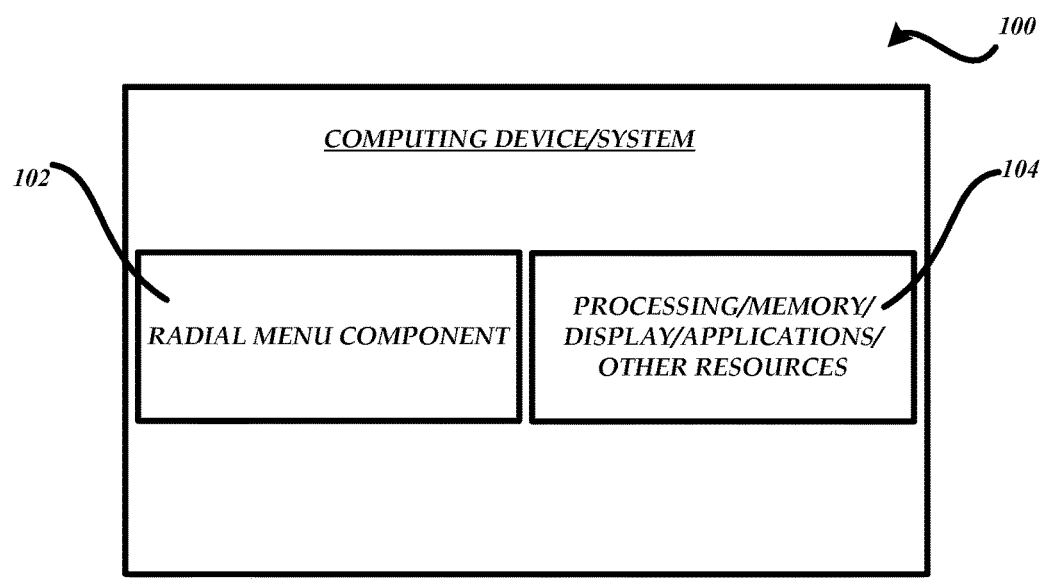
FIG. 1 is a block diagram of an exemplary device/system that includes radial menu features.

FIG. 1 is a block diagram of an exemplary computing device/system 100 that includes circular or radial menu user interface (UI) features but is not so limited. The radial menu UI features are configured to be used with various content types, contexts, applications, and/or operating systems (O/Ss). For example, the radial menu UI features can be included as part of select applications and/or an O/S component. As described below, the radial menu UI features of an embodiment provide at least primary and secondary menu levels activated in response to interactive inputs, such as touch or gesture actions, keyboard entries, mouse or pen actions, voice inputs, etc. The radial menu UI features allow a variety of user interactions including enabling users to activate menus, activate submenus, execute commands, scroll through menu items, provide contextual object galleries, and other features described below.

As shown in FIG. 1 and according to an embodiment, device/system 100 includes a circular or radial menu component 102 that operates in part to provide a radial menu UI configured to display a single ring of circumferentially disposed menu items (see FIGS. 3D-3H for example). The radial menu UI of an embodiment is configured to simultaneously display a selected primary (i.e., first level) menu item with one or more of a plurality of secondary level menu items associated with the selected primary menu item without expanding the circular space or requiring outer extensions, which is described further below. It will appreciated that device/system 100 is configured to store and execute multiple user applications and includes processing, memory, display, networking, and/or other resources (shown collectively as 104).

As described further below, the radial menu component 102 of an embodiment is configured to provide a radial menu UI that uses animations as part of displaying primary and/or secondary menu items. The radial menu component 102 of an embodiment includes complex programming code configured to display a radial menu UI that enables users to efficiently navigate and locate menu items while persisting a display of a selected primary menu item as part of maintaining user orientation and reference to an entry point that resulted in the display of secondary menu items. The radial menu UI allows users to efficiently navigate menu items and issue commands (e.g., apply a table format, apply a text format, apply a video format, apply a form, etc.) as part of achieving some desired result.

According to an embodiment, radial menu component 102 can be used to display a radial menu UI when a user selects certain content, an object, or other computer-implemented item. When first actuated, the radial menu UI of an embodiment is configured to display a single ring of circumferentially disposed primary menu items. Each primary menu item of an embodiment is configured to trigger display of one or more of a plurality of secondary menu items that operate to achieve a desired result according to a user selection. For example, secondary menu items that change table formats can be selected to adjust display of a table representation. Undo or similar operations can be used with the radial menu UI to override any undesirable results. As described below, the radial menu UI can be configured to display and/or animate the display of secondary menu items while simultaneously displaying an associated primary menu item.

The radial menu component 102 of an embodiment includes complex programming code that operates in part to persist display of a selected primary menu item interspersed between a plurality of displayed secondary menu items (see FIGS. 3F and 3H for example) as part of maintaining reference to the entry point used to display the associated secondary menu items. In contrast to conventional radial menu implementations, a selected primary menu item remains displayed while displaying associated secondary menu items without expanding the size of the radial space or requiring outer extensions. The radial menu component 102 enables users to utilize a variety of inputs types including touch inputs, mouse inputs, vocal inputs, and other inputs that enable a user to efficiently navigate and use radial menu items.

The radial menu component 102 operates in part to manage display of at least primary and secondary (also referred to as first and second level) circumferentially disposed menu items. As described above and further below, the radial menu component 102 of one embodiment is configured to dynamically populate menu items based in part on a context, device type, and/or application type. For example, the radial menu component 102 can be used to display a radial menu UI that includes primary and secondary menu items directed to word processing application menus, spreadsheet application menus, etc. As further example, the radial menu component 102 can operate to control display of a radial menu UI and associated menu items based on the dimensions or available screen area of an associated device/system. Additional radial menu features are described further below.

Moreover, client devices/systems described herein can be configured with at least one processor, system memory, networking, display, and/or other components. System memory can include volatile (e.g. random access memory (RAM)), non-volatile (e.g. read-only memory (ROM)), flash memory, etc. System memory can include an operating system and various application programs that can be used by an end-user. It will be appreciated that embodiments described herein may also be practiced in conjunction with other operating systems, device/system types, and/or other application programs.

Various embodiments can be used with a number of computer configurations, including hand-held devices, multiprocessor systems, microprocessor-based or programmable consumer electronics, minicomputers, mainframe computers, etc. Various embodiments can be implemented in distributed computing environments using remote processing devices/systems that communicate over a one or more communications networks. In a distributed computing environment, program modules or code may be located in both local and remote memory. In a system-on-a-chip (SOC) architecture, a central processing unit, a graphics processor, memory, USB controller, power management circuits, wireless radio(s) (WiFi, cellular, etc.), and/or other components can be used to provide application functionality.

Figure 2:
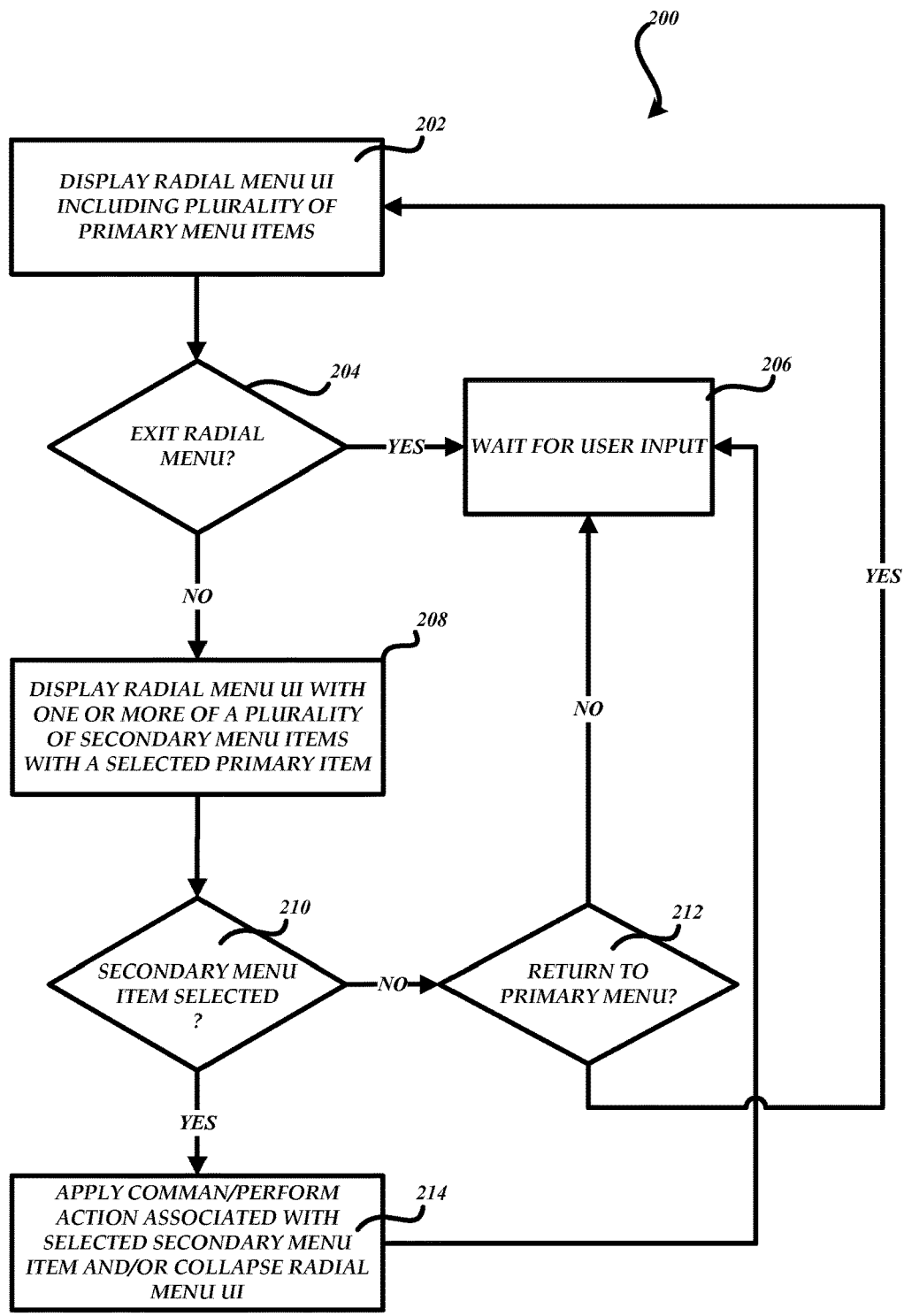
FIG. 2 is a flow diagram depicting an exemplary process of using a radial menu UI.

FIG. 2 is a flow diagram depicting an exemplary process 200 of using a radial menu UI. At 202, the process 200 begins by displaying a radial menu UI that includes a plurality of primary menu items in response to a user interaction. For example, a tablet user may use a radial menu UI having particular primary menu items displayed in response to an application context of an installed application. If the user exits the radial menu UI at 204, the process 200 proceeds to 206 and waits for further user interaction.

If the user does not exit the radial menu UI at 204, the process 200 proceeds to 208 and operates to display the radial menu UI with a plurality of secondary menu items along with a selected primary menu item in response to actuation of the selected primary menu item. In one embodiment, the selected primary menu item is contrastingly displayed between two of the plurality of secondary menu items. According to an embodiment, the process 200 at 208 operates to animate display of the secondary menu items according to animation boundaries defined by boundaries of a selected primary menu item. If a secondary menu item is not actuated at 210 and the user does not navigate back to the primary menu at 212, the process 200 proceeds to 206 and waits for user input.

If a secondary menu item is not actuated at 210 but the user does navigate back to the primary menu at 212, the process 200 returns to 202. If a secondary menu item is actuated at 210, the process 200 proceeds to 214 and operates to apply a command or perform an action associated with actuation of the secondary menu item and/or collapse the radial menu UI before returning to 206. In one embodiment, after applying a command or performing an action, the process 200 at 214 can be configured to return to the display of the primary menu items rather than collapsing or exiting the radial menu UI. While a certain number and order of operations are described for the exemplary flow of FIG. 2, it will be appreciated that other numbers and/or orders can be used according to desired implementations.

FIGS. 3A-3H depict an exemplary handheld computing device 300 configured with circular or radial menu features, but is not so limited. Those skilled in the art recognize that device 300 includes processing, graphics, memory, networking, and other operational components that operate in part to provide aspects of the radial menu features. The radial menu features allow users to efficiently navigate and locate menu items, allowing users to execute commands (e.g., apply a table format, apply a text format, apply a video format, apply a form, etc.) as part of achieving some desired result. For example, the radial menu features can be implemented as part of an application-specific component and/or O/S component with a tablet computer (e.g., SURFACE device) or smart phone (e.g., WINDOWS phone) as examples.

As shown in FIG. 3A, device 300 is currently executing an application to display data of a spreadsheet while a user interacts with the spreadsheet. For the depicted implementation, as a user selects content, selection border 302 encompasses a current user selection and includes handle 304 that operates in part to control which content is ultimately selected and used in conjunction with the radial menu features. For example, when using a touch screen, a user can use a fingertip to hold the handle 304 and slide the fingertip to move the handle 304 to a particular location, such as a cell of particular row and/or column for example. While for this example a spreadsheet type application is used as a context for using the radial menu features, it will be appreciated that the radial menu features can be implemented with other applications and/or contexts. For example, radial menu features can be included as part of a word processing application, drawing application, database application, video and image applications, and other application types.

FIG. 3B depicts the device 300 after a user has released handle 304 to define selected content. According to an embodiment as shown in FIG. 3B, as a result of the selection (e.g., removing a fingertip, releasing a mouse button, etc.), complex programming code operates to display trigger interface 306 adjacent to the selected content. According to an embodiment, when trigger interface 306 is actuated (e.g., tapped, clicked, etc.), complex programming code operates to animate and/or transform the trigger interface 306 into the radial menu UI 308 shown in FIG. 3D.

FIG. 3C depicts an intermediate animation step associated with expansion of the trigger interface 306 into a larger diameter circular display 307 before populating a final circumferential or radial dimension of the radial menu UI 308 with primary or first level menu items as shown by the example of FIG. 3D. It will be appreciated that there may be multiple or no intermediate animations before display of a final circumferential dimension of the radial menu UI 308 which may be dependent on the available screen real estate, readability settings, or some other factor. In one embodiment, radial menu UI 308, including any primary and/or secondary menu items, can be configured to display without execution of any intermediate display animations or steps after actuation of trigger interface 306. For example, once a primary menu item is selected, the radial menu UI 308 can be configured to operate in real or near real time to simultaneously display a plurality of secondary menu items with respect to the selected primary menu item.

FIG. 3D depicts the device 300 displaying radial menu UI 308 including a plurality of primary or first level menu items 310, 312, 314, 316, and 318 circumferentially disposed within an outer border 320, which for this example is configured as circular or substantially circular. For this implementation, each menu item is configured with a wedge or pie slice shape. It will be appreciated however that other numbers and/or shapes of menu items can be used. According to an embodiment, each primary menu item can be actuated (e.g., tapped, clicked, etc.) to trigger display of a plurality of secondary or second level menu items, wherein each of the plurality of secondary menu items are configured to apply an action or execute a command when actuated.

Figure 3E:
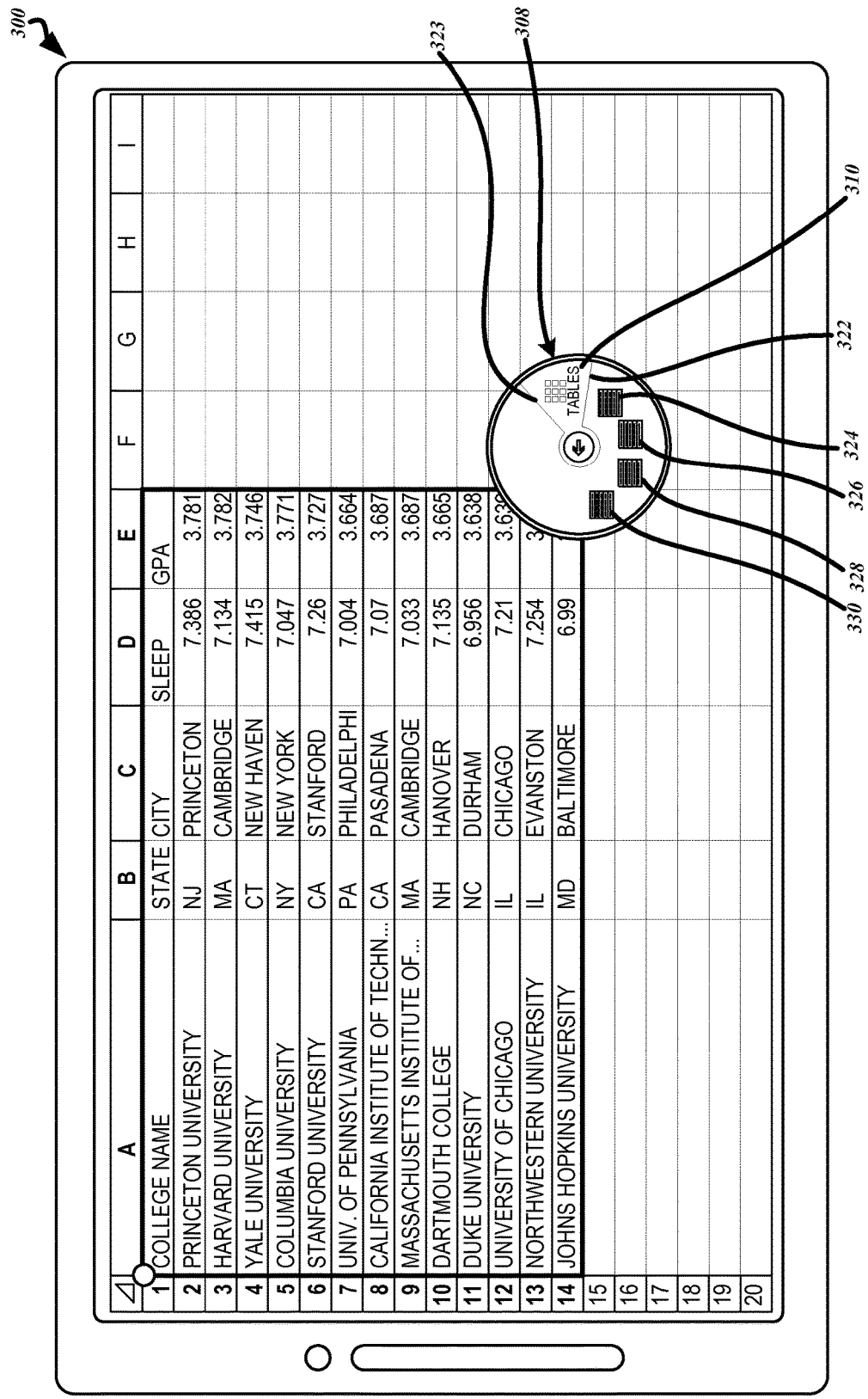

FIG. 3E depicts the radial menu UI 308 while animating the display of secondary menu items after actuation of primary menu item 310. For this example, actuation of the primary menu item 310 operates to animate a display of one or more of a plurality secondary menu items beginning from a first boundary or portion 322 of the primary menu item 310 in a rotational manner towards the second boundary or portion 323. As shown in FIG. 3E, the radial menu UI 308 is shown at a point in time during the animation where secondary menu items 324, 326, 328, and 330 have animated rotationally from the first boundary 322 towards the second boundary 323. While not shown, the rotational animation begins with secondary menu item 330 emanating from the first boundary 322 and rotating towards the second boundary 323, followed by secondary menu item 328 emanating from the first boundary 322 and rotating towards the second boundary 323, and so forth.

With continuing reference to FIG. 3E, in contrast to conventional radial menu implementations, primary menu item 310 remains displayed in the same position while displaying and/or animating the display of one or more of the secondary menu items. The displayed secondary menu items take the place of previously displayed primary menu items with the exception of primary menu item 310. Depending on the number of secondary menu items, additional secondary menu items may be hidden and surfaced as a user interacts with the secondary menu items. The radial menu UI 308 is configured to receive a variety of inputs, including scrolling (e.g., swipes, etc.) and other input types that enable a user to efficiently navigate and use the radial menu UI 308.

Figure 3F:
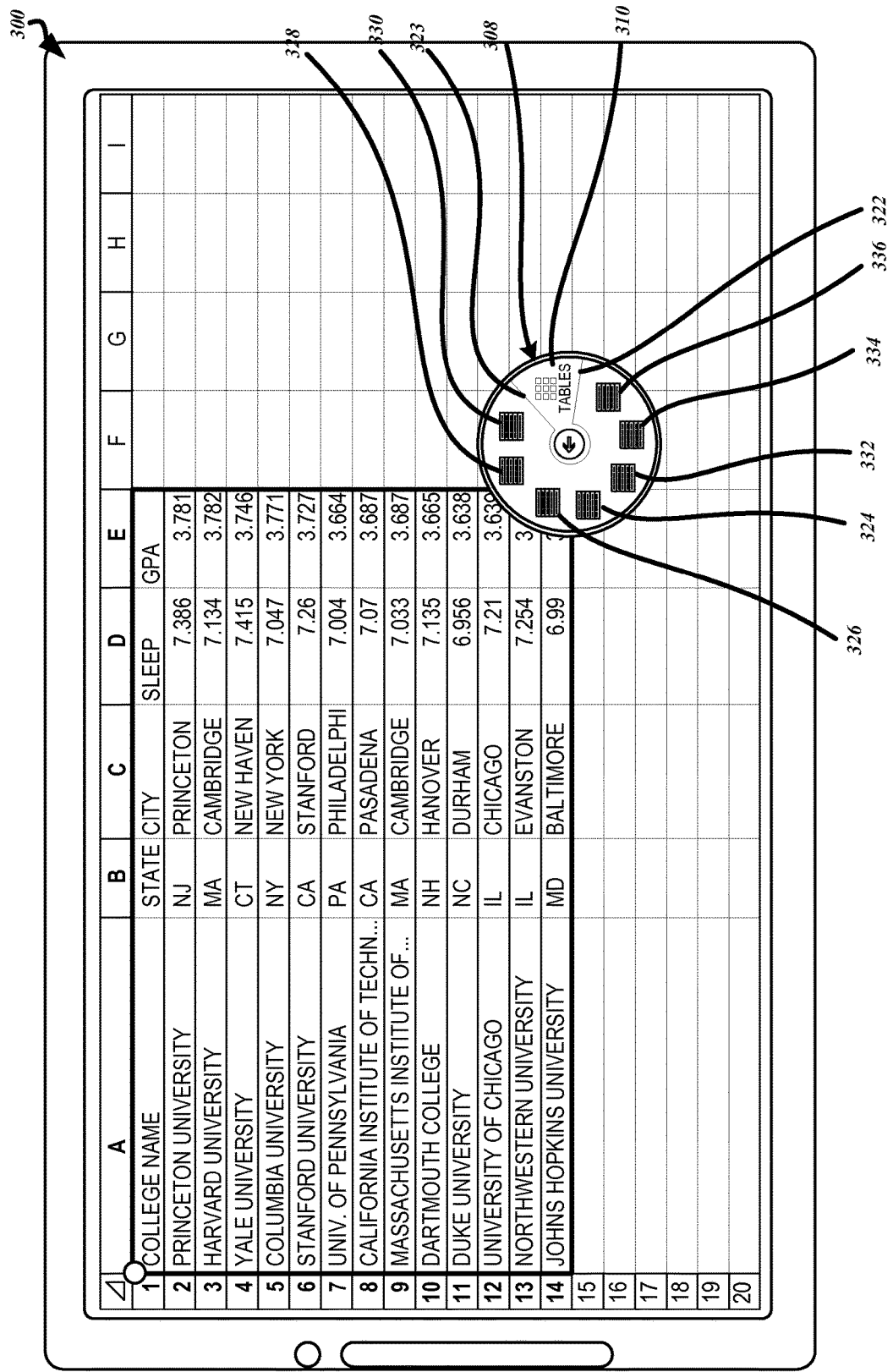

Referring now to FIG. 3F, the animation of the secondary menu items continues by traversing in a rotational manner with display of additional secondary menu items 332, 334, and 336 emanating from the first boundary 322 of the primary menu item 310. As shown for the example of FIG. 3F, the user has multiple table style options provided by the displayed (and potentially hidden) secondary menu items, while continuing to persist display of primary menu item 310. As described above, the persisted display of the primary menu item 310 while displaying secondary menu items provides a reference to the entry point that surfaced display of the secondary menu items and operates to orient rather than disorient a user.

The radial menu UI features described herein operate in part to promote extended battery life and more efficient component use resulting in reduced power consumption by device 300 due in part to the resultant number of inputs and amount of time required to execute an action/command by actuating primary and secondary menu items. The user is no longer required to use additional inputs as part of backtracking to identify an entry point associated with displayed secondary menu items. In an alternative embodiment, in addition to launching secondary menu items, one or more of the primary menu items can also be configured to, when actuated, execute a command and/or perform an action on selected content, an object, etc. The radial menu UI 308 is not limited to two menu item levels and can include addition control levels and/or other configurations.

The radial menu UI 308 can be closed or exited from in a number of ways including after actuation of a secondary menu item, tapping/clicking outside of the outer border 320, or by some other defined interaction. For example, a user can tap outside of the outer border 320 to collapse the radial menu UI 308. As another example, the radial menu UI 308 can collapse or close once a user has actuated (e.g., tapped or clicked) secondary menu item 330 and applied the associated table format to the selected spreadsheet. In another embodiment, rather than collapsing or closing upon a defined interaction, the radial menu UI 308 can be configured to transition from displaying secondary menu items back to displaying primary menu items to once again provide multiple potential entry points for accessing secondary menu items.

Figure 3G:
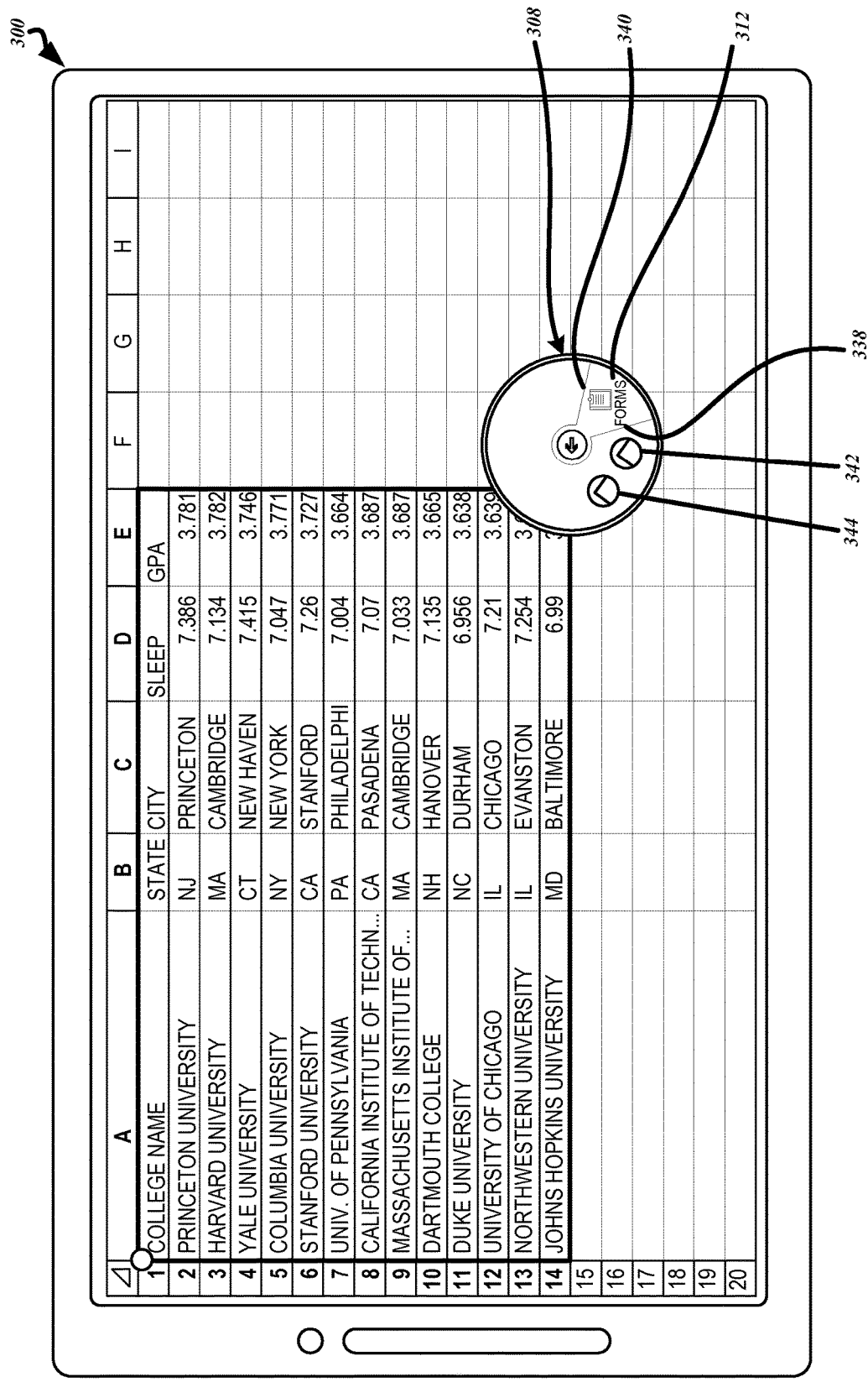

Referring again to FIG. 3D and with additional reference to FIG. 3G, assume that, in response to further user interaction, the device 300 again displays radial menu UI 308 including the plurality of primary or first level menu items 310, 312, 314, 316, and 318. As described above, the radial menu UI 308 can be configured to display different types of menu items based on a context, an application type, device/system type, or some other factor. As shown in FIG. 3G, in response to selection of primary menu item 312, the radial menu UI 308 again operates to animate a display of secondary menu items associated with primary menu item 312. Actuation of the primary menu item 312 operates to animate a display of one or more of a plurality secondary menu items beginning from a first boundary or portion 338 of the primary menu item 312 in a rotational manner towards the second boundary or portion 340.

As shown in FIG. 3G, the radial menu UI 308 is shown at a point in time during the animation where secondary menu items 342 and 344 have animated in a rotational fashion from the first boundary 338 towards the second boundary 340. While not shown, the rotational animation begins with secondary menu item 344 emanating from the first boundary 338 and rotating towards the second boundary 340, followed by secondary menu item 342 emanating from the first boundary 338 and rotating towards the second boundary 340. As described above, in accordance with an embodiment and in contrast to conventional radial menu implementations, primary menu item 312 remains displayed in the same position while displaying and/or animating the display of secondary menu items. The displayed secondary menu items take the place of previously displayed primary menu items with the exception of primary menu item 312. Depending on the number of secondary menu items, additional secondary menu items may be hidden and surfaced as a user interacts with the secondary menu items.

Figure 3H:
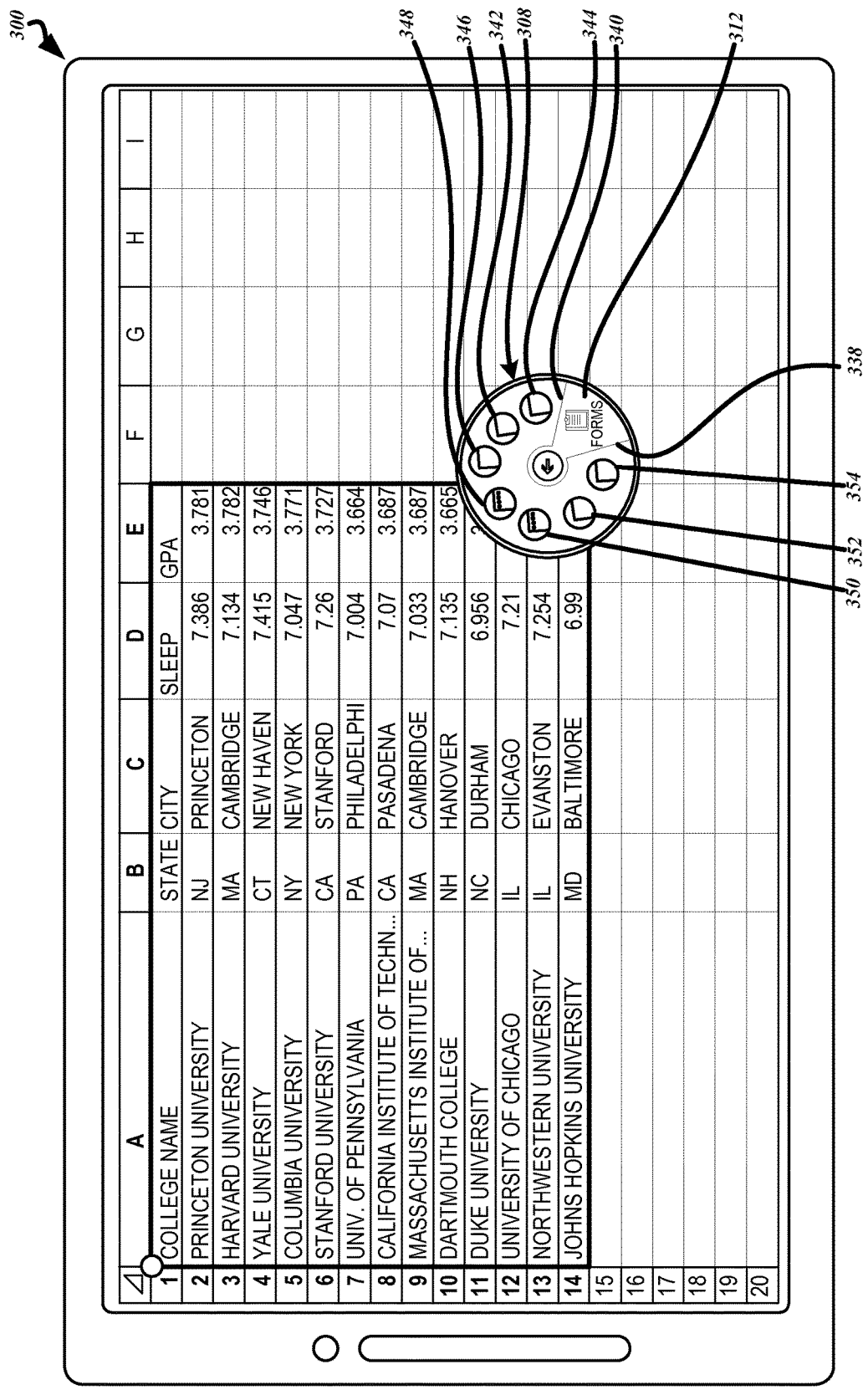

Referring now to FIG. 3H, the animation of the secondary menu items continues by traversing in a rotational manner with display of additional secondary menu items 346-354 emanating in turn from the first boundary 338 of primary menu item 312. As shown for the example of FIG. 3H, the user has multiple form options to choose from via displayed secondary menu items 342-354 and remains oriented due in part to the persisted display of primary menu item 312 with the associated secondary menu items. As described above, the persisted display of the primary menu item 312 while displaying secondary menu items operates to maintain a reference to the entry point that resulted in the display of the secondary menu items.

As will be appreciated, the adjacent or in-context display location of the radial menu UI 308 and associated menu items overcomes issues associated with requiring a user to move away from a current focus and hunt to locate and apply some menu action from a detached or otherwise removed from current focus menu interface. The proximate display of the radial menu UI 308 in relation to a user selection allows a user to maintain focus on the current task while navigating about the radial menu UI 308. The radial menu UI 308 is sized and configured to enable users to conveniently and effortlessly locate circumferentially-disposed menu items and/or apply any associated menu action(s). Each menu item can be sized and configured as touch or click targets including text and/or an icon/symbol for ready identification of each menu item. As an implementation example, a radial menu UI 308 having a smaller diameter may be included for a smart phone type device with limited display area as compared to a larger diameter for a tablet device having a larger display area. The radial menu UI 308 can be configured to dynamically adjust in size in response to zoom or other user interactions.

It will be appreciated that various features described herein can be implemented as part of a processor-driven computer environment including hardware and software components. Also, while certain embodiments and examples are described above for illustrative purposes, other embodiments are included and available, and the described embodiments should not be used to limit the claims. Suitable programming means include any means for directing a computer system or device to execute steps of a process or method, including for example, systems comprised of processing units and arithmetic-logic circuits coupled to computer memory, which systems have the capability of storing in computer memory, which computer memory includes electronic circuits configured to store data and program instructions or code.

An exemplary article of manufacture includes a computer program product useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations. The term computer readable media as used herein can include computer storage media or computer storage. The computer storage of an embodiment stores program code or instructions that operate to perform some function. Computer storage and computer storage media can include volatile and nonvolatile, removable and non-removable media implemented in any method or technology for storage of information, such as computer readable instructions, data structures, program modules, etc.

System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of a device or system. By way of example, and not limitation, communication media may include wired media such as a wired network or direct-wired connection, and wireless media such as acoustic, RF, infrared, and other wireless media.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components which include, but are not limited to, wide area networks (WANs), local area networks (LANs), metropolitan area networks (MANs), proprietary networks, backend networks, cellular networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions.

Terms used in the description, such as component, module, system, device, cloud, network, and other terminology, generally describe a computer-related operational environment that includes hardware, software, firmware and/or other items. A component can use processes using a processor, executable, and/or other code. Exemplary components include an application, a server running the application, and/or an electronic communication client coupled to a server for receiving communication items. Computer resources can include processor and memory resources such as: digital signal processors, microprocessors, multi-core processors, etc. and memory components such as magnetic, optical, and/or other storage devices, smart memory, flash memory, etc. Communication components can be used to communicate computer-readable information as part of transmitting, receiving, and/or rendering electronic communication items using a communication network or networks, such as the Internet for example. Other embodiments and configurations are included.

Referring now to FIG. 4, the following discussion is intended to provide a brief, general description of a suitable computing environment in which embodiments can be implemented. While described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

As shown in FIG. 4, computer 2 comprises a general purpose server, desktop, laptop, handheld, or other type of computer capable of executing one or more application programs including applications that use circular or radial features or other application functionality. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules/resources 26.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

According to various embodiments, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

Figure 5A:
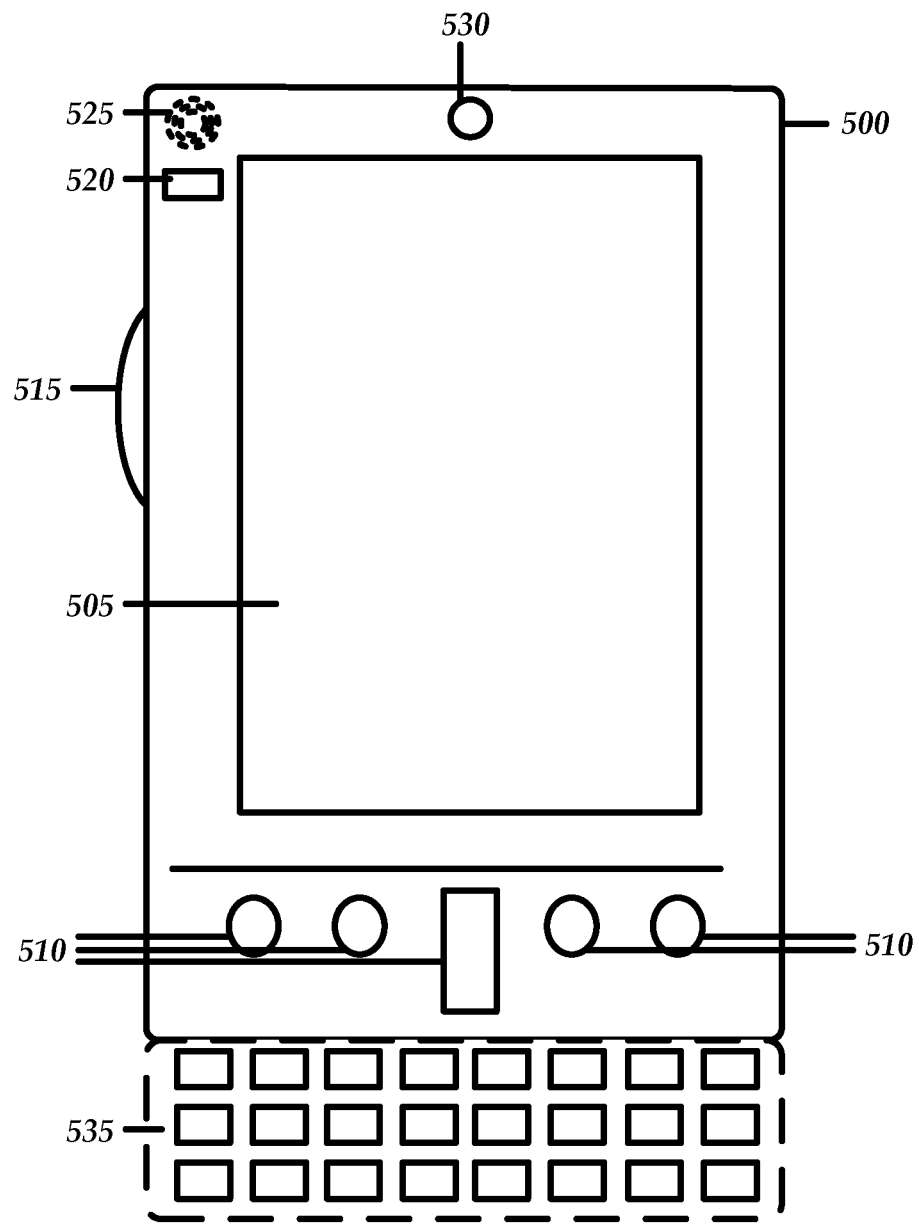
FIGS. 5A-5B illustrate a mobile computing device with which embodiments may be practiced.
Figure 5B:
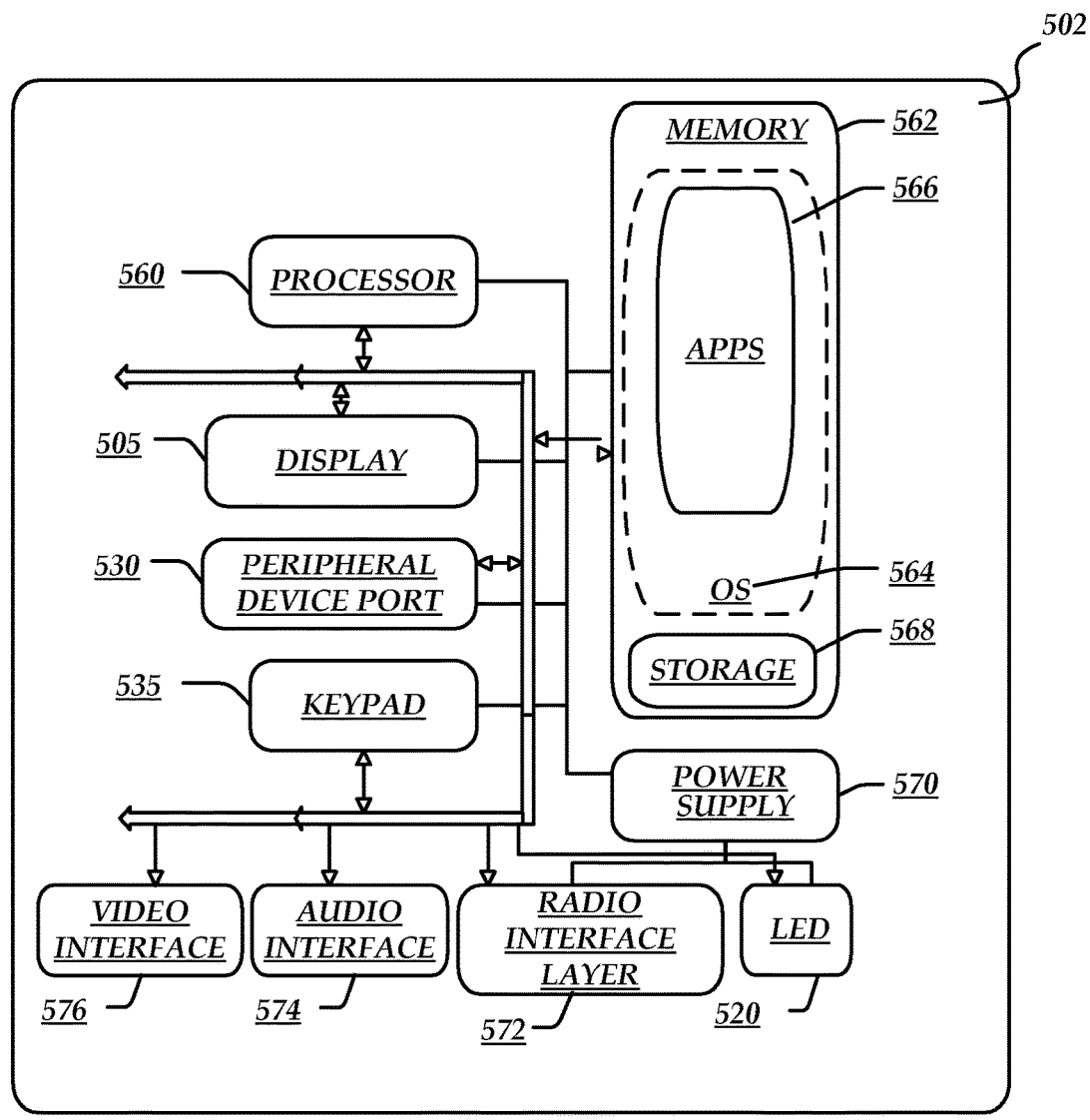

FIGS. 5A-5B illustrate a mobile computing device 500, for example, a mobile telephone, a smart phone, a tablet personal computer, a laptop computer, and the like, with which embodiments may be practiced. With reference to FIG. 5A, one embodiment of a mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566, including application programs that utilize a circular or radial menu interface, may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562.

The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 566 via the operating system 564, and vice versa.

The visual indicator 520 may be used to provide visual notifications and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device.

The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments, the microphone may also serve as an audio sensor to facilitate control of notifications, as will be described below. The system 502 may further include a video interface 576 that enables an operation of an on-board camera 530 to record still images, video stream, and the like. A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
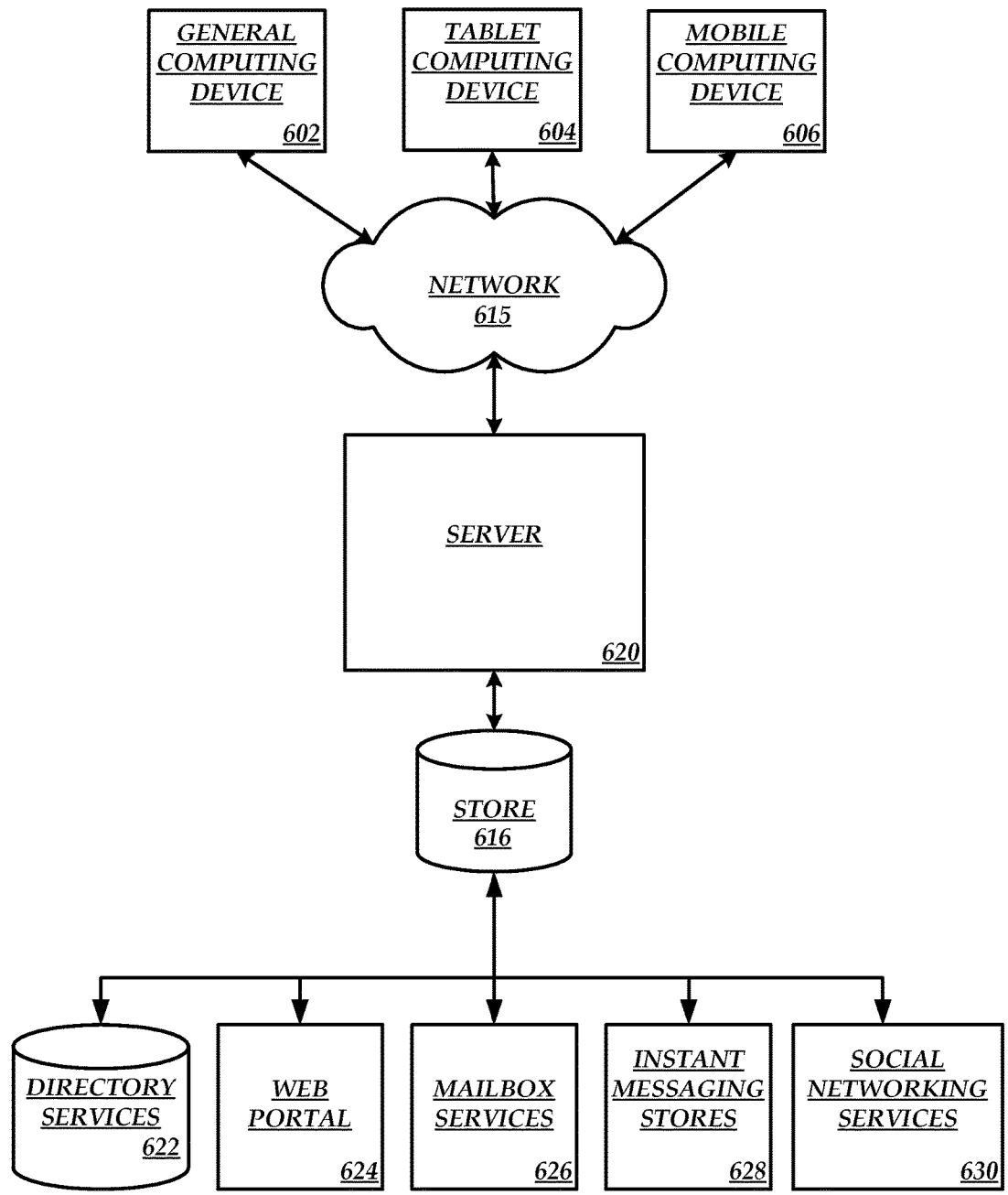
FIG. 6 illustrates one embodiment of a system architecture that includes one or more client devices.

FIG. 6 illustrates one embodiment of the architecture of a system that includes one or more client devices. Content, including electronic documents that include text, may be stored in different communication channels or other storage types. For example, various information may be stored using a directory service 622, a web portal 624, a mailbox service 626, an instant messaging store 628, and/or a social networking site 630. As one example, the server 620 may be communicated with over network 615, such as the Internet or other network for example. By way of example, the client computing device may be implemented as a general computing device 602 and embodied in a personal computer, a tablet computing device 604, and/or a mobile computing device 606 (e.g., a smart phone). Any of these clients may use content from the store 616.

Embodiments, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

It should be appreciated that various embodiments can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
displaying, on a display of a mobile computing device, a radial menu including a plurality of first level menu items within a circumferential menu boundary in response to a radial menu display trigger;
in response to a selected first level menu item:
updating the radial menu to completely remove all non-selected first level menu items from display while maintaining display of the selected first level menu item in its original location in the radial menu;
updating the radial menu to include a plurality of second level menu items displayed simultaneously with the selected first level menu item within the circumferential menu boundary, the selected first level menu item in its original location,
wherein updating of the radial menu further includes placing the second level menu items within a same radially-defined space previously occupied by the non-selected first level menu items.

2. The method of claim 1, further comprising animating display of the plurality of second level menu items with respect to the selected first level menu item.

3. The method of claim 2, wherein the animating the display of the plurality of second level menu items begins from a first boundary of the selected first level menu item and continues rotationally until ending at a second boundary of the selected first level menu item.

4. The method of claim 1, further comprising performing an action associated with selected data in response to selection of a second level menu item.

5. The method of claim 1, wherein the plurality of first level menu items and the plurality of second level menu items are configured as wedge shaped touch targets configured to receive touch inputs.

6. The method of claim 1, further comprising in response to selection of a different first level menu item, using the radial menu as part of simultaneously displaying a plurality of second level menu items of a second type with the different first level menu item within the outer radial menu boundary.

7. The method of claim 1, further comprising, providing functionality for scrolling the plurality of second level menu items with respect to boundaries of the selected first level menu item including revealing one or more hidden second level menu items while continuing to display the selected first level menu item.

8. The method of claim 1, further comprising returning to the first level menu items by selecting a location outside the circumferential menu boundary and, in response to the selection of the location, completely removing the second level menu items from the radial menu and re-displaying the previously non-selected first level menu items in the radial menu.

9. A mobile computing device configured to:
display, on a display of the mobile computing device, a circular menu including a plurality of primary menu items in response to a selection of content; and
in response to a selected primary menu item:
update the circular menu to completely remove all non-selected primary menu items of the plurality of menu items from display while maintaining display of the selected primary menu in its original location within the circular menu;
display the circular menu with a plurality of secondary menu items simultaneously with the selected primary menu item, the primary menu item in its original location, wherein the plurality of second level menu items are displayed within a same circularly-defined space previously occupied by the non-selected first level menu items.

10. The device of claim 9 further configured to use an animation to display the plurality of secondary menu items with respect to the selected primary menu item including using boundaries of the selected primary menu item to bound the animation.

11. The device of claim 9 further configured to perform an action associated with selection of a secondary menu item.

12. The device of claim 9 further configured in response to selection of another primary menu item to display a plurality of secondary menu items of a different type along with the another primary menu item.

13. The device of claim 9, wherein a selection of content precedes adjacent display of the circular menu in relation to selected content.

14. The device of claim 9 further configured to collapse the circular menu upon applying an action associated with activation of a secondary menu item.

15. The device of claim 14 further configured to re-display the circular menu in response to selection of content or an object.

16. The device of claim 9 further configured to display the circular menu with a defined border and the plurality of secondary menu items and the selected primary menu item within the defined border of the circular menu.

17. The device of claim 9 further configured to display different types of primary menu items in the circular menu based on an application context.

18. An article of manufacture which stores instructions that operate to:
animate, on a display of a mobile computing device, a display of a radial menu including a plurality of first level menu items in response to a radial menu display trigger; and
in response to a selected first level menu item:
animating the radial menu to completely remove all non-selected first level menu items of the plurality of first level menu items from display while maintaining display of the selected first level menu item in its original location in the radial menu;
animating the radial menu to include a plurality of second level menu items displayed simultaneously with the selected first level menu item, the selected first level menu item being in its original location, wherein the plurality of second level menu items are displayed within a same radially-defined space previously occupied by the non-selected first level menu items.

19. The article of manufacture of claim 18 which stores instructions that operate further to animate the display of the plurality of second level menu items with respect to boundaries of the selected first level menu item.

20. The article of manufacture of claim 18 which stores instructions that operate further to simultaneously display the plurality of second level menu items with respect to first and second boundaries of the selected first level menu item.

* * * * *